(12) United States Patent
Ottmann

(10) Patent No.: US 12,459,020 B2
(45) Date of Patent: Nov. 4, 2025

(54) SYSTEM AND METHOD FOR FACILITATING PULSED SPRAY QUENCH OF EXTRUDED OBJECTS

(71) Applicant: TESLA, INC., Austin, TX (US)

(72) Inventor: Jared E. Ottmann, Fremont, CA (US)

(73) Assignee: Tesla, Inc., Austin, TX (US)

( * ) Notice: Subject to any disclaimer, the term of this patent is extended or adjusted under 35 U.S.C. 154(b) by 373 days.

(21) Appl. No.: 18/150,683

(22) Filed: Jan. 5, 2023

(65) Prior Publication Data
US 2023/0141136 A1 May 11, 2023

Related U.S. Application Data

(62) Division of application No. 16/690,043, filed on Nov. 20, 2019, now Pat. No. 11,554,399.

(Continued)

(51) Int. Cl.
*B21C 29/00* (2006.01)
*B05B 12/12* (2006.01)
(Continued)

(52) U.S. Cl.
CPC .......... *B21C 29/003* (2013.01); *B05B 12/122* (2013.01); *B21C 23/002* (2013.01);
(Continued)

(58) Field of Classification Search
CPC ... B21C 29/003; B21C 23/002; B05B 12/122; B05B 1/083; C22F 1/002; C22F 1/05; C21D 1/673; C21D 11/005
See application file for complete search history.

(56) References Cited

U.S. PATENT DOCUMENTS

| 3,709,745 A | * | 1/1973 | Koeplinger et al. ...... C22F 1/06 148/667 |
| 11,554,399 B2 | | 1/2023 | Ottmann |

(Continued)

FOREIGN PATENT DOCUMENTS

| CN | 106222372 A | * | 12/2016 | ............... C21D 1/19 |
| CN | 108554470 | | 9/2018 | |

(Continued)

OTHER PUBLICATIONS

"U.S. Appl. No. 16/690,043, Restriction Requirement mailed Feb. 14, 2022", 7 pgs.

(Continued)

*Primary Examiner* — Rebecca Janssen
(74) *Attorney, Agent, or Firm* — Schwegman Lundberg & Woessner, P.A.

(57) ABSTRACT

Systems and methods for quenching an extrudate using an atomized spray of liquid are described. A system includes a billet die at a proximal end configured to accept a billet and form an extrudate, a quench chamber located adjacent to the billet die for receiving the extrudate and comprising at least one pulsed width modulation (PWM) atomizing spray nozzle and a control module in communication with the at least one PWM atomizing spray nozzle and configured to independently control a liquid pressure, a gas pressure, a spray frequency, a duty cycle and flow rate of each at least one PWM atomizing spray nozzle.

21 Claims, 11 Drawing Sheets

Related U.S. Application Data

(60) Provisional application No. 62/770,443, filed on Nov. 21, 2018.

(51) Int. Cl.
  *B21C 23/00*  (2006.01)
  *C21D 1/673*  (2006.01)
  *C21D 11/00*  (2006.01)
  *C22F 1/00*   (2006.01)
  *C22F 1/05*   (2006.01)

(52) U.S. Cl.
  CPC ............... *C22F 1/002* (2013.01); *C22F 1/05* (2013.01); *C21D 1/673* (2013.01); *C21D 11/005* (2013.01)

(56) References Cited

U.S. PATENT DOCUMENTS

2017/0306465 A1 10/2017 Skubich et al.
2020/0156133 A1 5/2020 Ottmann

FOREIGN PATENT DOCUMENTS

WO  WO-2017221671 A1 * 12/2017 ............ B21B 45/02
WO  WO-2021079806     4/2021

OTHER PUBLICATIONS

"U.S. Appl. No. 16/690,043, Response filed Apr. 18, 2022 to Restriction Requirement mailed Feb. 14, 2022", 6 pgs.
"U.S. Appl. No. 16/690,043, Non Final Office Action mailed Apr. 28, 2022", 13 pgs.
"U.S. Appl. No. 16/690,043, Response filed Jul. 26, 2022 to Non Final Office Action mailed Apr. 28, 2022", 7 pgs.
"U.S. Appl. No. 16/690,043, Notice of Allowance mailed Aug. 29, 2022", 9 pgs.
"U.S. Appl. No. 16/690,043, 312 Amendment filed Sep. 27, 2022", 3 pgs.
U.S. Appl. No. 16/690,043 U.S. Pat. No. 11,554,399, filed Nov. 20, 2019, System and Method for Facilitating Pulsed Spray Quench of Extruded Objects.
Bernardin et al., Apr. 2004, A leidenfrost point model for impinging droplets and sprays, Journal of Heat Transfer, 126:272-278.
Deiters et al., 1989, Optimization of spray quenching for aluminum extrusion, forging, or continuous casting, J. Heat Treat., 7(1):9-18.
Sanders, Sep. 14, 2010, Thermal treatments during processing of aluminum extrusion alloys, AEC Webinar Presentation, 34 pp.

* cited by examiner

Spray at 100% and 50% duty cycle

SYSTEM AND METHOD FOR FACILITATING PULSED SPRAY QUENCH OF EXTRUDED OBJECTS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is a divisional of U.S. application Ser. No. 16/690,043, filed Nov. 20, 2019, which claims priority to U.S. Provisional App. No. 62/770,443, filed Nov. 21, 2018, each of which are herein incorporated by reference in their entirety.

BACKGROUND

Field

This disclosure is generally related to metal treatments. More specifically, this disclosure is related to techniques for quenching extruded metal objects.

Description of the Related Art

Extruded metal objects, especially aluminum alloy objects, are widely used in construction and automotive industry. The extrusion behavior and mechanical properties of aluminum alloys can be sensitive to the microstructure of the billets after homogenization. Typically, as for the homogenization treatment of 6XXX alloys, a soaking procedure can be used to dissolve the large Si and Mg containing precipitates into the Al matrix. The cooling practice, on the other hand, determines the precipitation behavior of $Mg_2Si$, and thus can have a considerable influence on the extrusion performance of the billet and the mechanical properties of the final product.

In general, an extruded aluminum alloy object is subject to a quenching process, which typically involves a treatment to cool the object quickly. This quick cooling can lock the $Mg_2Si$ particles in the aluminum matrix of the alloy. The post-extrusion quench process facilitates improved mechanical properties of the final product.

SUMMARY

For purposes of summarizing the disclosure and the advantages achieved over the prior art, certain objects and advantages of the disclosure are described herein. Not all such objects or advantages may be achieved in any particular embodiment. Thus, for example, those skilled in the art will recognize that the invention may be embodied or carried out in a manner that achieves or optimizes one advantage or group of advantages as taught herein without necessarily achieving other objects or advantages as may be taught or suggested herein.

In one aspect, a metal quenching system having a proximal end and a distal end is described. The system includes a billet die at the proximal end configured to accept a billet and form an extrudate, a quench chamber located adjacent to the billet die for receiving the extrudate and comprising at least one pulsed width modulation (PWM) atomizing spray nozzle, and a control module in communication with the at least one PWM atomizing spray nozzle and configured to independently control a liquid pressure, a gas pressure, a spray frequency, a duty cycle and flow rate of each at least one PWM atomizing spray nozzle.

In some embodiments, at least one PWM atomizing spray nozzle comprises a plurality of PWM atomizing spray nozzles. In some embodiments, the quench chamber comprises a PWM atomizing spray nozzle positioned on each of a top side, a bottom side, a left side and a right side of the quench chamber.

In some embodiments, the system further comprises a pyrometer positioned at the proximal end of the quench chamber. In some embodiments, the system further comprises a pyrometer positioned at the distal end of the quench chamber. In some embodiments, the quench chamber further comprises rollers configured to receive and guide the extrudate through the quench chamber. In some embodiments, the quench chamber comprises four quench zones positioned sequentially from the proximal end to the distal end of the quench chamber, wherein each quench zone comprises at least one PWM atomizing spray nozzle. In some embodiments, the system further comprises a first profile scanner positioned at the proximal end of the quench chamber and a second profile scanner positioned at the distal end of the quench chamber. In some embodiments, the control module is in communication with the first and second profile scanners.

In another aspect, a metal quenching process is described. The process includes extruding an extrudate from a die at a first temperature, spraying the extrudate with at least one pulsed width modulated (PWM) atomized spray of a liquid to achieve a quenching rate, and obtaining a quenched extrudate at a second temperature.

In some embodiments, the liquid comprises water. In some embodiments, the process further comprises spraying the extrudate with at least one continuous atomized spray of the liquid prior to spraying with at least one PWM atomized spray of the liquid. In some embodiments, spraying comprises sequentially spraying the extrudate with a first at least one PWM atomized spray, a second at least one PWM atomized spray, and a third at least one PWM atomized spray. In some embodiments, spraying comprises spraying a top side, a bottom side, a left side and a right side of the extrudate each with a PWM atomized spray.

In some embodiments, spraying is performed at a spray frequency of about 10 Hz to about 200 Hz. In some embodiments, spraying is performed at a duty cycle of about 25% to about 50%. In some embodiments, spraying is performed at a flow rate of about 0.5-10 gallons/min. In some embodiments, a quench rate from extruding the extrudate and obtaining the quenched extrudate is about 5-1000° C./sec.

In some embodiments, wherein a first profile of the extrudate is measured before spraying of the extrudate, and a second profile of the extrudate is measured after spraying of the extrudate. In some embodiments, an extrudate distortion is calculated from the first and second profiles, and at least one of a spray frequency, a duty cycle, and a flow rate of the at least one PWM atomized spray is adjusted.

In some embodiments, the extrudate is an aluminum metal or metal alloy. In some embodiments, the extrudate is an aluminum-silicon-magnesium alloy. In some embodiments, the quenched extrudate has a yield strength of about 100-600 MPa.

All of these embodiments are intended to be within the scope of the invention herein disclosed. These and other embodiments will become readily apparent to those skilled in the art from the following detailed description of the preferred embodiments having reference to the attached figures, the invention not being limited to any particular preferred embodiment(s) disclosed.

BRIEF DESCRIPTION OF THE DRAWINGS

These and other features, aspects, and advantages of the present disclosure are described with reference to the drawings of certain embodiments, which are intended to illustrate certain embodiments and not to limit the invention.

DETAILED DESCRIPTION

Figure 1:
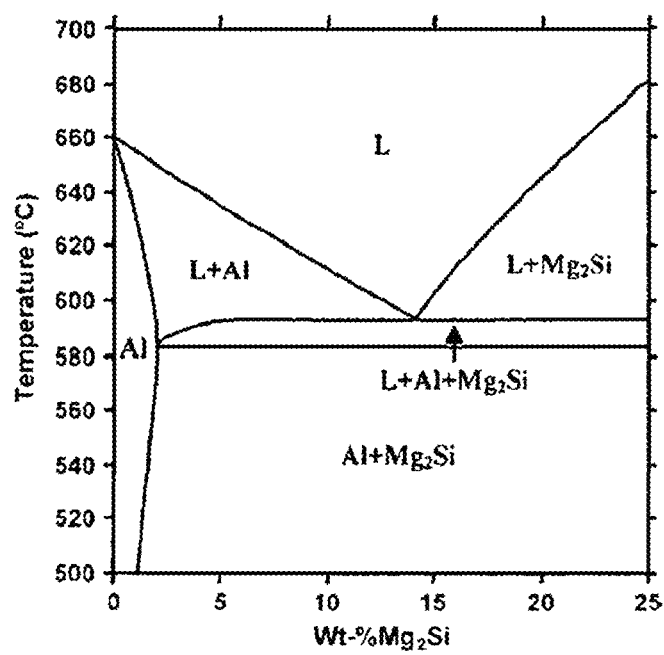
FIG. 1 depicts an Al—Mg$_2$Si phase diagram.

Extruded metal objects, such as 6000 series (i.e. 6XXX) aluminum alloys, often require heat quenching to optimize the homogenization process, which provides higher mechanical properties. FIG. 1 depicts an Al—Mg$_2$Si phase diagram that shows quick cooling of Al—Si—Mg alloys locks Mg$_2$Si particles into the aluminum matrix. Such effective heat treatments allow for higher alloy mechanical properties.

Figure 2:
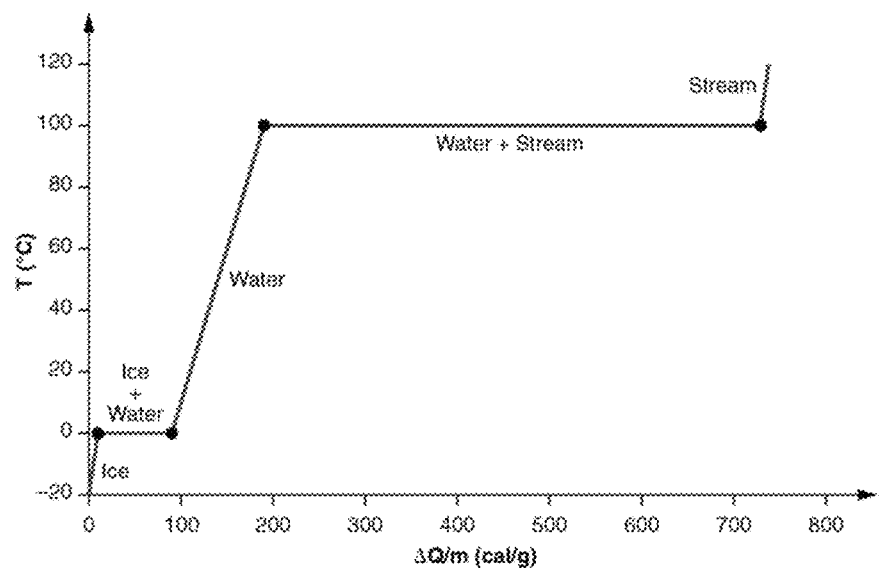
FIG. 2 depicts the heat absorption properties during the phase transformation of water into steam.
Figure 3A:
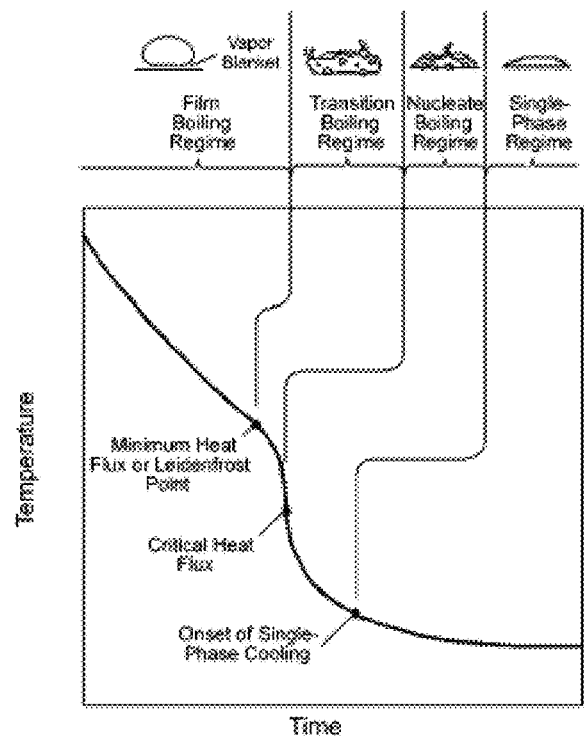
FIGS. 3A and 3B graphically depict the performance of water when in contact with a hot surface that lead to the Leidenfrost effect.
Figure 3B:
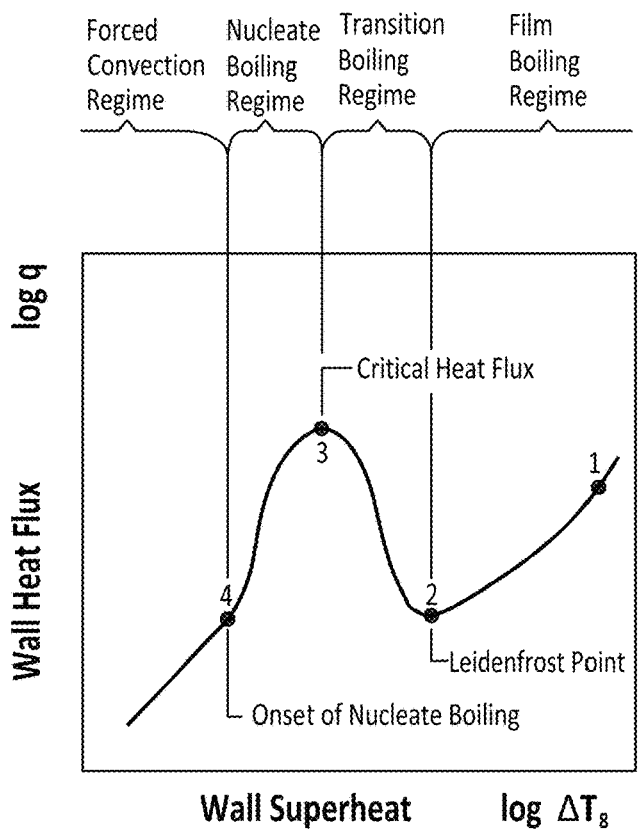

In order to obtain effective heat treatments, water is typically used in alloy quench processes in part because of its heat absorption properties during the phase transformation from water into steam, as depicted in FIG. 2. However, conventional quenching techniques that typically employ a high-pressure water spray are subject to the Leidenfrost effect. FIGS. 3A and 3B graphically depict the performance of water when in contact with a hot surface (e.g. metal surface) that leads to the Leidenfrost effect where a vapor barrier layer over the surface is formed that inhibits heat transfer. As a result, the Leidenfrost effect may prevent effective removal of heat from the hot surface (e.g. alloy quenching).

Embodiments of the present disclosure minimize or overcome the Leidenfrost effect, and thereby improve the quench rate. In particular, the disclosure provides a mechanism for producing atomized water droplets for effective quenching of a metal billed. In other embodiments, the water is sprayed in pulses onto the billet which gives time for the vapor barrier to dissipate before the next atomized spray is emitted by the nozzle. These small-sized water droplets evaporate quickly upon contact with the object's hot surface, which minimizes or reduces the Leidenfrost effect and allows for improved quench rate.

Although certain embodiments and examples are described below, those of skill in the art will appreciate that the invention extends beyond the specifically disclosed embodiments and/or uses and obvious modifications and equivalents thereof. Thus, it is intended that the scope of the invention herein disclosed should not be limited by any particular embodiments described below.

In some embodiments, an atomized fluid spray is produced by a two fluid spray nozzle. The two fluid spray nozzle independently controls the pressure of the liquid exiting the nozzle, and the pressure of the gas used to atomize the liquid into spray droplets of a desired morphology and distribution. In some embodiments, a Pulse Width Modulated (PWM) atomized fluid spray is produced by a Pulse Width Modulated (PWM) spray nozzle, which allow for independent control of (1) frequency of the pulses (Hz); (2) duty cycle of the pulses (%); (3) pressure of the liquid (e.g. water, oil, polymer quench solution (e.g. polyvinyl pyrrolidone (PVP) and water), or combinations thereof, (4) pressure of the gas (e.g. air) used in atomizing the liquid; and (5) liquid flow rate (mL/s). The independent control of these parameters can allow the system to control more precisely the quenching process, thereby achieving the desired quench results. In some embodiments, a system may facilitate independent control of the above parameters among different quench zones as well as between different nozzles.

Figure 4:
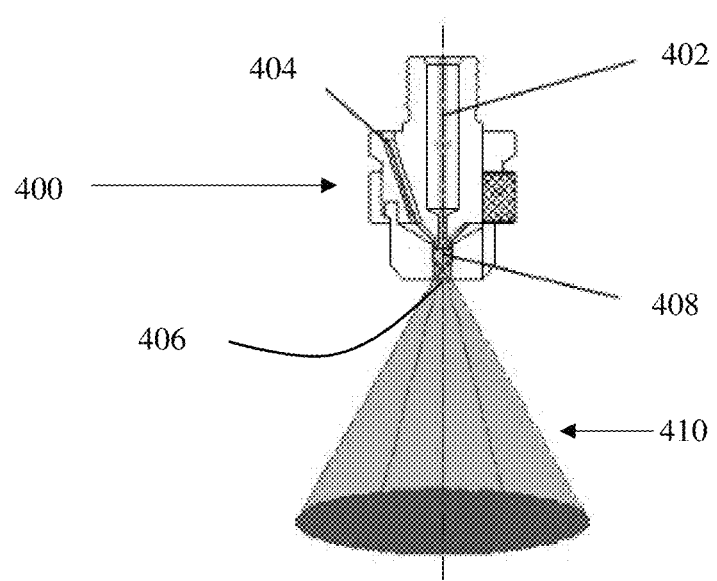
FIG. 4 depicts an example of a pulsed width modulated spray nozzle.

FIG. 4 depicts an example of a PWM spray nozzle 400. The PWM spray nozzle 400 includes a liquid input port 402, a gas input port 404 and a spray tip 406 where the liquid input port 402 and gas input port 404 meet. The PWM spray nozzle 400 further includes a valve 408 used to block or close off the liquid input port 402 and the gas input port 404. In some embodiments, the valve 408 is a solenoid valve. As a pressurized liquid flows through the liquid input port 402, the liquid is atomized by a pressurized gas flowing through the gas input port 404 and forms an atomized liquid spray 410. The pressure of the liquid flowing through the liquid input port 402, the pressure of the gas flowing through the gas input port, and the valve 408 may be independently controlled through the use of a control system in communication this the PWM spray nozzle. In some embodiments, at least one PWM spray nozzle is utilized in a system or device. In some embodiments, a plurality of PWM spray nozzles are utilized in a system or device.

In some embodiments, a spray nozzle employs a liquid pressure of, or of about, 100 psi, 125 psi, 150 psi, 175 psi, 200 psi, 225 psi, 240 psi, 250 psi, 275 psi, 300 psi, 325 psi or 350 psi, or any range of values therebetween. In some embodiments, a spray nozzle employs a liquid pressure of, or of about, 10 Bar, 11 Bar, 12 Bar, 13 Bar, 14 Bar, 15 Bar, 16 Bar, 17 Bar, 18 Bar, 19 Bar or 20 Bar, or any range of values therebetween. For example, in some embodiments the spray nozzle employs a liquid pressure of, or of about, 100-350 psi, 150-350 psi, or 10-20 Bar.

In some embodiments, a spray nozzle employs a gas pressure of, or of about, 0.1 Bar, 0.5 Bar, 1 Bar, 2 Bar, 3 Bar, 4 Bar, 5 Bar, 6 Bar, 7 Bar, 8 Bar, 9 Bar, 10 Bar, 15 Bar or 20 Bar, or any range of values therebetween. For example, in some embodiments the spray nozzle employs a gas pressure of, or of about, 0.1-20 Bar or 1-10 Bar.

In some embodiments, the flow rate is, or is about, 1 mL/s, 5 mL/s, 10 mL/s, 20 mL/s, 30 mL/s, 40 mL/s, 50 mL/s, 75 mL/s, 100 mL/s, 125 mL/s, 150 mL/s, 200 mL/s, 300 mL/s, 400 mL/s, 500 mL/s, 650 mL/s, 750 mL/s or 1000 mL/s, or any range of values therebetween. In some embodiments, the flow rate is, or is about, 0.1 gallons/min, 0.5 gallons/min, 1 gallons/min, 2 gallons/min, 3 gallons/min, 4 gallons/min, 5 gallons/min, 6 gallons/min, 7 gallons/min, 8 gallons/min, 9 gallons/min, 10 gallons/min, 15 gallons/min or 20 gallons/min, or any range of values therebetween. For example, in some embodiments, the flow rate is, or is about, 1-1000 mL/s, 150-750 mL/s, 50-150 mL/s or 0.5-10 gallons/min.

Figure 5A:
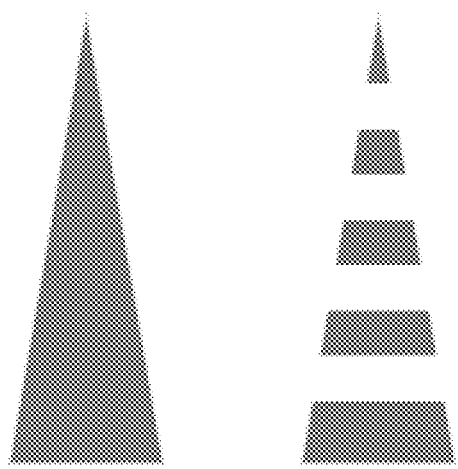
FIGS. 5A and 5B depict duty cycles of pulsed width modulated sprays of liquids.
Figure 5B:
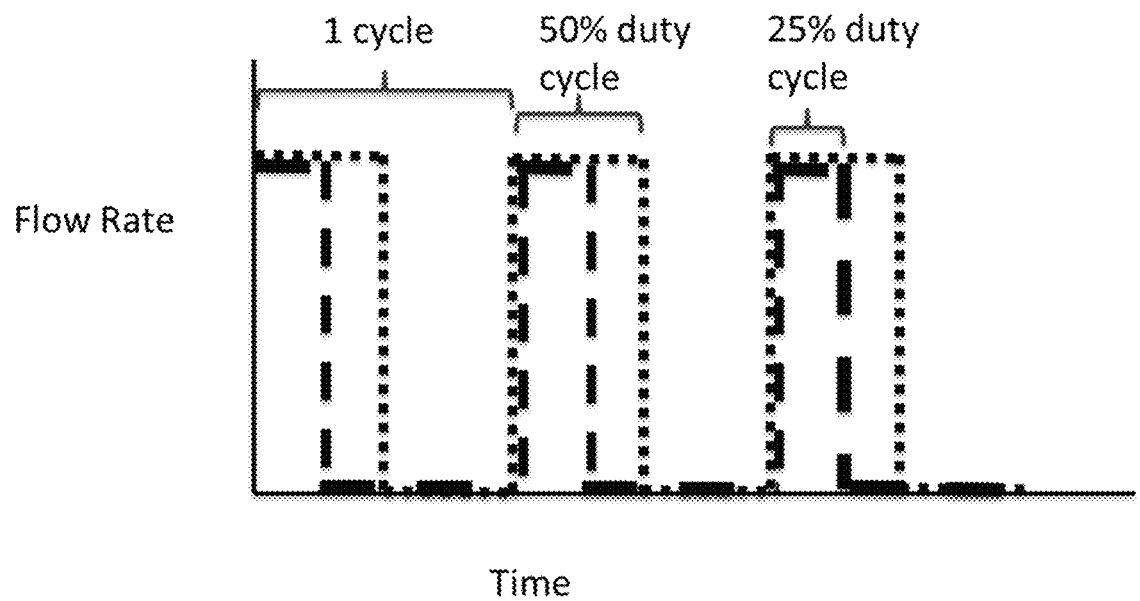

FIGS. 5A and 5B depict duty cycles of PWM sprays of liquids. A duty cycle characterizes the amount of time the nozzle remains open for during a single frequency cycle of spray pulses. As shown in FIG. 5A if the duty cycle is 100% then liquid is sprayed continuously (i.e. there are no liquid spray pulses), and if the duty cycle is 50% then during each frequency cycle the nozzle remains open to spray liquid for 50% of the cycle. FIG. 5B depicts a flow rate v. time graph of a 50% duty cycle and a 25% duty cycle. For example, if the nozzle is operating at 1 Hz ($s^{-1}$) at 50% duty cycle, the nozzle will be open for 0.5 s and closed of 0.5 s. As another example, if the nozzle is operating at 1 Hz ($s^{-1}$) at 25% duty cycle, the nozzle will be open for 0.25 s and closed of 0.75 s.

In some embodiments, the pulse frequency is, or is about, 5 Hz, 10 Hz, 15 Hz, 20 Hz, 25 Hz, 30 Hz, 40 Hz, 50 Hz, 75 Hz, 100 Hz, 150 Hz, 200 Hz, 250 Hz or 300 Hz, or any range of values therebetween. For example, in some embodiments, the pulse frequency is, or is about, 5-300 Hz, 10-250 Hz, or 10-100 Hz.

In some embodiments, the duty cycle is, or is about, 5%, 10%, 15%, 20%, 25%, 30%, 40%, 50%, 60%, 70%, 80%, 90%, 95% or 100%, or any range of values therebetween. For example, in some embodiments the duty cycle is, or is about, 5-100% or 25-75%.

Figure 6:
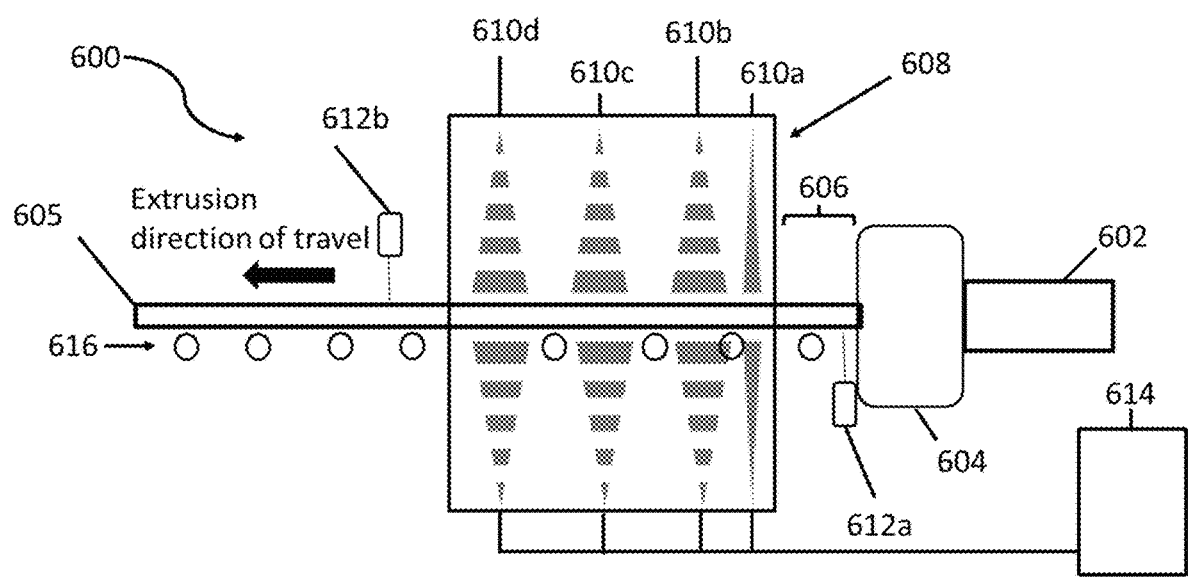
FIG. 6 depicts an embodied system for quenching an extrudate with an atomizing spray.

FIG. 6 depicts an embodied system 600 for quenching an extrudate with an atomizing spray. The system 600 comprises a billet 602 forced through a die 604 to form an extrudate 605. The system 600 is configured such that the extrudate 605 travels from proximal to the die 604, through a quench delay dimension 606, then into an exiting a quench chamber 608. The extrudate 605 travels through the system 600 by the use of a guide system 616. In some embodiments, guide system 616 comprises rollers. The quench chamber 608 is shown comprising a first quench zone 610a, a second quench zone 610b, a third quench zone 610c and a fourth quench zone 610d, although the quench chamber 608 may comprise any number of quench zones, for example such as 1, 2, 3, 4, 5, 6, 7, 8, 9 or 10 quench zones, or any range of values therebetween. In some embodiments, a quench zone comprises at least one atomizing spray nozzle. In some embodiments, a quench zone comprises a plurality of atomizing spray nozzles. In some embodiments, a quench zone comprises 1, 2, 3, 4, 5, 6, 7, 8, 9 or 10 atomizing spray nozzles, or any range of values therebetween. In some embodiments, an atomizing spray nozzle is a PWM spray nozzle. As depicted in FIG. 6, each quench zone 610a-610d comprises two atomizing spray nozzles each shown spraying extrudate 605 with atomized sprays of liquid. The atomized spray nozzles of first quench zone 610a are shown continuously spraying (i.e. 100% duty cycle) extrudate 605 with an atomized spray, while the atomizing spray nozzles of the second, third and fourth quench zones 610b-610d are shown as PWM spray nozzles spraying extrudate 605 with an atomized spray at a <100% duty cycle. The temperature of the extrudate 605 is measured before the extrudate 605 enters the quench chamber 608 using a first temperature meter 612a, and the temperature of the extrudate 605 is measured after the extrudate 605 exits the quench chamber 608 using a second temperature meter 612b. Controller 614 is shown in communication with quench zones 610a-610d, and therefore the atomizing spray nozzles of each quench zone, and is configured to independently control the spray parameters (e.g. pulse frequency, duty cycle, liquid pressure, gas pressure, flow rate) of each of the atomizing spray nozzles.

In some embodiments, the extrudate comprises a metal. In some embodiments, the extrudate is a metal or a metal alloy. In some embodiments, the extrudate comprises aluminum or an aluminum alloy, copper or a copper alloy, and/or zinc or a zinc alloy, or combinations thereof. In some embodiments, the extrudate is an aluminum-silicon-magnesium alloy.

Figure 7:
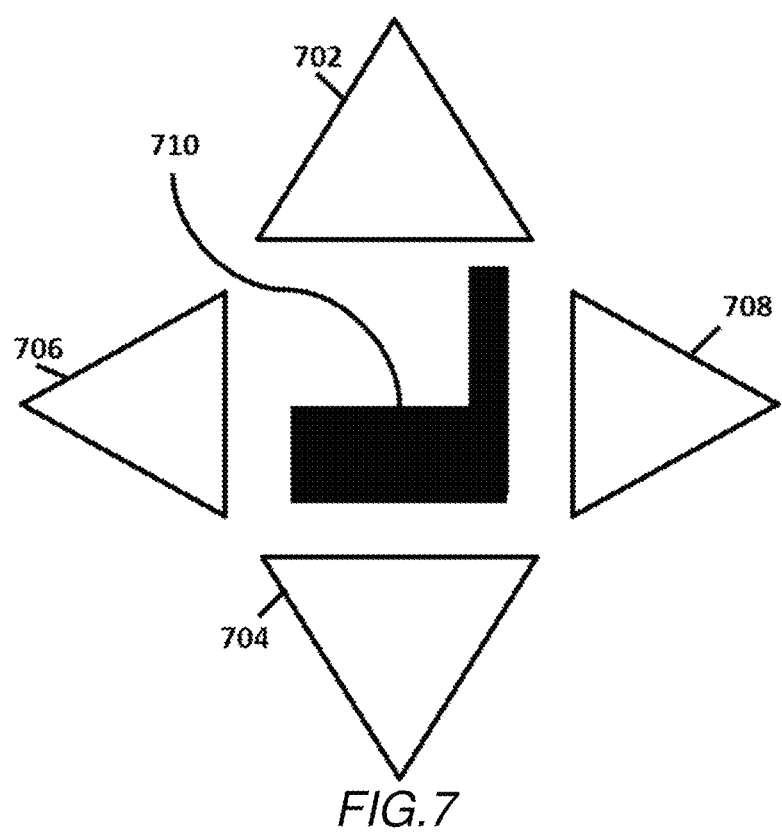
FIG. 7 depicts a cross-section of an extrudate traveling through a quench zone of a quench chamber.

FIG. 7 depicts a cross-section of an extrudate 710 traveling through a quench zone of a quench chamber, wherein the quench zone includes a top atomized spray 702, a bottom atomized spray 704, a left atomized spray 706, and a right atomized spray 708. The extrudate 710 depicted in FIG. 7 is of an irregular (i.e. asymmetrical) cross-sectional geometry such that the top, bottom, left and right sides of the extrudate 710 are expected to cool at varying rates during a quenching process. Such variation in extrudate geometry, and therefore cooling, plays a role in extrudate distortion during quench. For example, under the same top, bottom, left and right atomized spray 702, 704, 706, 708 parameters the thin section at the right side of the extrudate 710 will cool and contract at a faster rate than the remainder of the extrudate 710, and therefore may stress and bow the right side of the extrudate 710 leading to distortion of the extrudate 710. However, independent control of the parameters of the top, bottom, left and right atomized sprays 702, 704, 706, 708 may allow for reduction, minimization or elimination of distortion of the extrudate 710 during quenching by homogenization of the surface cooling rates of the extrudate. For example, a top, bottom and left atomized sprays 702, 704, 706 configured with a pulse frequency of 200 Hz and a duty cycle of 50%, while a right atomized spray 708 configured with a pulse frequency of 200 Hz and a duty cycle 25% may allow the cooling rate of the thin section at the right side of the extrudate 710 to be brought in line with that of the extrudate 710 as a whole, and therefore reduce distortion of the extrudate 710 during the quenching process.

Although a top, bottom, left and right atomized sprays 702, 704, 706, 708 are depicted in FIG. 7, it is to be understood that the quench chamber may include fewer or additional atomized sprays from the same or additional directions within the quench chamber, and may be sprayed at angles normal (i.e. =90°) or diagonal (i.e. ≠90°) to a surface of the extrudate 710. The atomized sprays may be formed from atomizing spray nozzles, such as PMW spray nozzles, described herein. Furthermore, the extrudate 710 may be of other irregular shapes in addition to the irregular shape depicted in FIG. 7 or may be of a regular (i.e. symmetrical) shape, for example such as a circular, oval, square, rectangle, or triangle shaped extrudate. In some embodiments, the extrudate may be contain a void where extrudate material is not present. In some embodiments, the void may be of an irregular or a regular shape, such as for example a circular, oval, square, rectangle, or triangle shaped void. For example, if the extrudate is a pipe, the cross-section of the extrudate will have a circular shape and a circular shaped void positioned in the center of the extrudate, thereby forming a ring shape.

Figure 8:
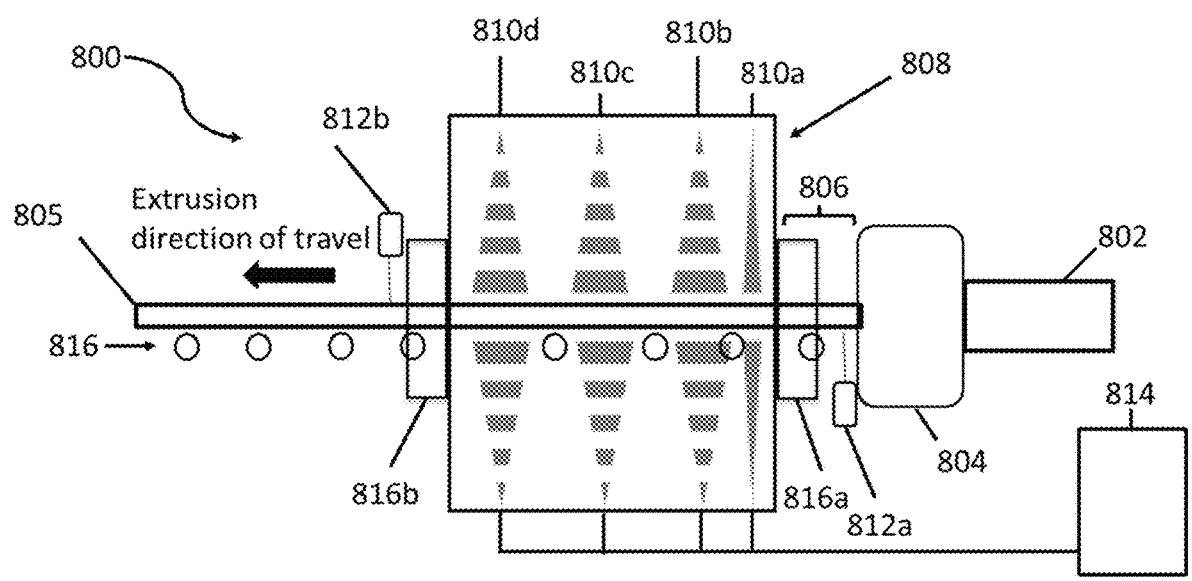
FIG. 8 depicts an embodied system for quenching an extrudate with an atomizing spray and profile scanners.

FIG. 8 depicts an embodied system 800 for quenching an extrudate with an atomizing spray, similar to the system 600 depicted in FIG. 6, including a billet 802, a die 804, an extrudate 805, a quench delay dimension 806, a quench chamber 808, a guide system 816, a first quench zone 810a, a second quench zone 810b, a third quench zone 810c a fourth quench zone 810d, a first temperature meter 812a, a second temperature meter 812b, and a controller 814. However the system 800 of FIG. 8 also includes a first profile scanner 816a and a second profile scanner 816b positioned to measure the profiles of the extrudate 805 before entering and after exiting the quench chamber 808. In some embodiments, the first and/or second profile scanners 816a, 816b may each include a pair of profile scanners. In some embodiments, the pair of profile scanners may be positioned 25 mm, 50 mm, 100 mm, 125 mm, 150 mm, 200 mm, 300 mm or 500 mm apart from each other, or any range of values therebetween. In some embodiments, the difference in profile alignment between the profile scanners 816a, 816b are used to obtain distortion measurements, such as the twist factor (i.e. angular rotation) and/or bow vector (i.e. translation), of the extrudate 805 after quenching. In some embodiments, the first and/or second profile scanners 816a, 816b are in communication with the controller 814.

Figure 9A:
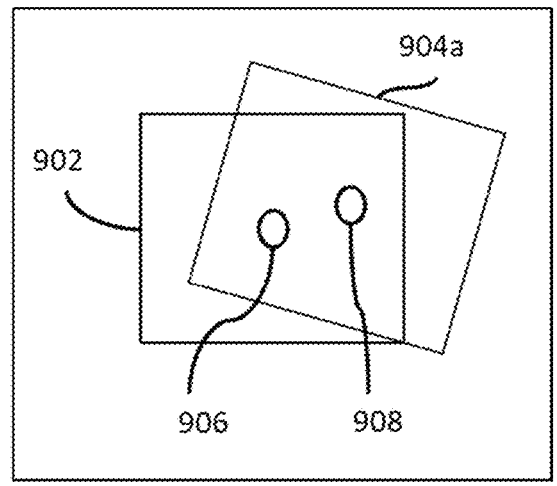
FIGS. 9A-9C depict profile scans of an extrudate used to measure any distortion of the extrudate after quenching.
Figure 9B:
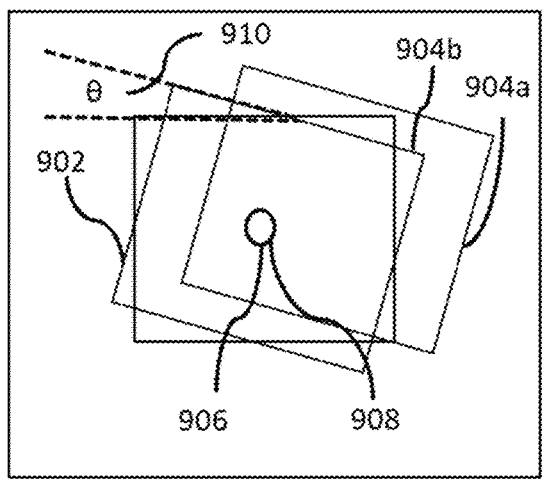
Figure 9C:
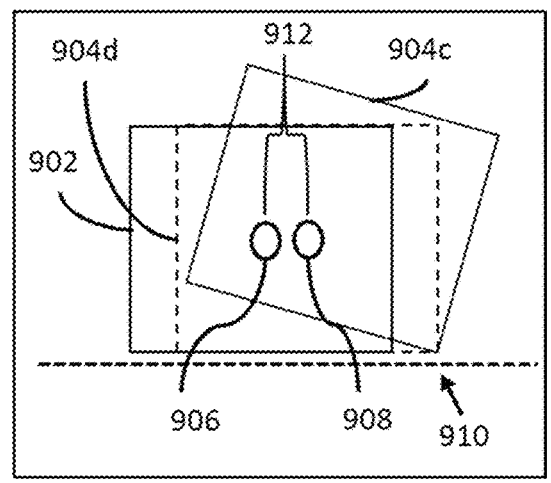

FIGS. 9A-9C depict profile scans of an extrudate used to measure any distortion of the extrudate after quenching. FIG. 9A depicts a pre-quench scan 902 of an extrudate with pre-quench centroid 906 and a post-quench scan 904a with post-quench centroid 908. As depicted in FIG. 9B, post-quench scan 904a is vertically and horizontally translated to a first post-quench scan position 904b such that pre-quench and post-quench centroids 906, 908 are aligned and twist angle 910 is determined. As depicted in FIG. 9C, post-quench scan 904a is first vertically translated to align the scan with a scan runout plane 910 a second post-quench scan position 904c, and then rotated to align the scan with the scan runout plane 910 at a third post-quench scan position 904d such that bow vector 912 is determined as the distance between the pre-quench and post-quench centroids 906, 908. Once the twist factor and bow vector are determined, spray parameters of each atomizing spray (e.g. pulse frequency, duty cycle, liquid pressure, gas pressure, flow rate) may be individually adjusted to compensate for extrudate distortion.

Figure 10:
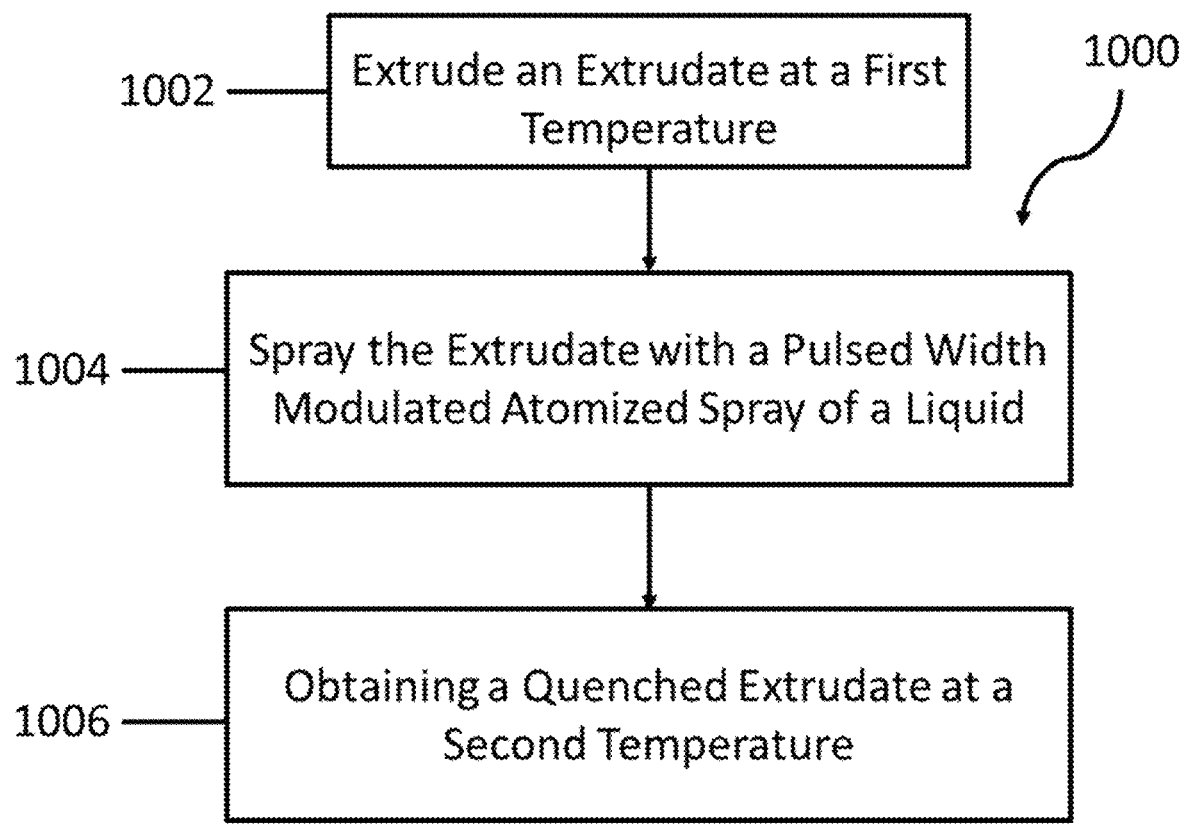
FIG. 10 depicts a flow chart process of quenching an extrudate.

FIG. 10 depicts a flow chart process 1000 of quenching an extrudate. In process 1000, an extrudate is extruded at a first temperature 1002, the extrudate is sprayed with a PWM atomized spray of a liquid 1004, and a quenched extrudate is obtained as a second temperature 1006. In some embodiments, the extrudate is sprayed with an atomized spray, as described herein. In some embodiments, a system as described herein may be used to perform process 1000.

In some embodiments, the extrudate is quenched at a quench rate of, of about, of at least, of at least about, of at most, or of at most about, 1° C./sec, 2° C./sec, 5° C./sec, 10° C./sec, 25° C./sec, 50° C./sec, 75° C./sec, 100° C./sec, 150° C./sec, 200° C./sec, 250° C./sec, 500° C./sec, 750° C./sec, 1000° C./sec, 1250° C./sec or 1500° C./sec, or any range of values therebetween. For example, in some embodiments the extrudate is quenched at a quench rate of, of about, 1-1500° C./sec, 5-1000° C./sec, 100-1000° C./sec, or 200-1250° C./sec. In some embodiments, the quench rate refers to the average quench rate achieved by a quenching chamber, or the quench rate achieved by a single or a plurality of quench zones.

In some embodiments, the quenched extrudate has a yield strength of, of about, of at least, of at least about, of at most, or of at most about, 100 MPa, 150 MPa, 200 MPa, 225 MPa, 250 MPa, 275 MPa, 300 MPa, 325 MPa, 350 MPa, 400 MPa, 500 MPa, 600 MPa, 700 MPa or 1000 MPa, or any range of values therebetween. For example, in some embodiments, the quenched extrudate has a yield strength of, or of about, 100-1000 MPa, 100-600 MPa, 200-350 MPa, 250-350 MPa or 250-325 MPa.

Figure 11:
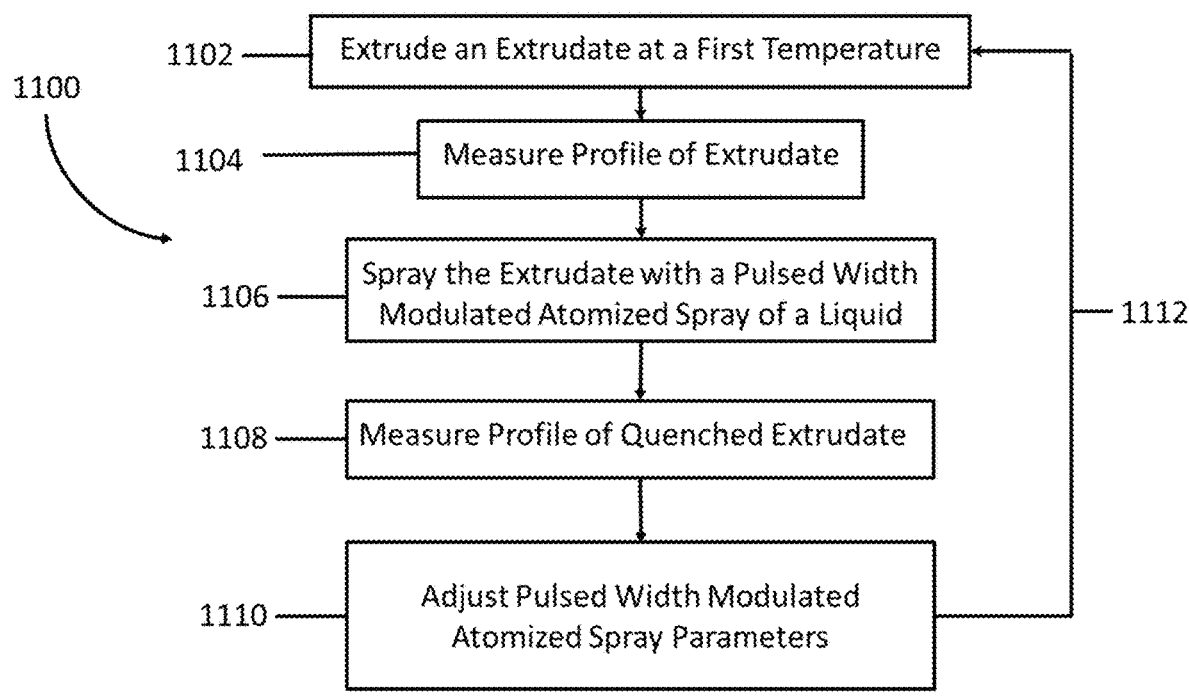
FIG. 11 depicts a flow chart process of quenching an extrudate and adjusting spray parameters to compensate for extrudate distortion.

FIG. 11 depicts a flow chart process 1100 of quenching an extrudate and adjusting spray parameters to compensate for extrudate distortion. In process 1100, an extrudate is extruded at a first temperature 1102, the profile of the extrudate is measured 1104, the extrudate is sprayed with a PWM atomized spray of a liquid 1106 to form a quenched extrudate, the profile of the quenched extrudate is measured 1108, and the PWM atomized spray parameters are adjusted 1110 to compensate for the extrudate distortion measured. This process may be repeated 1112 such that extrudate distortion is reduced.

While certain embodiments have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products. For example, any of the components for an energy storage system described herein can be provided separately, or integrated together (e.g., packaged together, or attached together) to form an energy storage system.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and within less than 0.01% of the stated amount, depending on the desired function or desired result.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

The headings provided herein, if any, are for convenience only and do not necessarily affect the scope or meaning of the devices and methods disclosed herein.

What is claimed is:

1. A metal quenching system having a proximal end and a distal end, comprising:
   a billet die at the proximal end configured to accept a billet and form an extrudate;
   a quench chamber located adjacent to the billet die for receiving the extrudate and comprising at least one pulsed width modulation (PWM) atomizing spray nozzle;
   a control module in communication with the at least one PWM atomizing spray nozzle and configured to independently control a liquid pressure, a gas pressure, a spray frequency, a duty cycle and a flow rate associated with the at least one PWM atomizing spray nozzle; and
   a first profile scanner positioned at the proximal end of the quench chamber and a second profile scanner positioned at the distal end of the quench chamber.

2. The system of claim 1, wherein the at least one PWM atomizing spray nozzle comprises a plurality of PWM atomizing spray nozzles.

3. The system of claim 2, wherein the quench chamber comprises a PWM atomizing spray nozzle positioned on each of a top side, a bottom side, a left side and a right side of the quench chamber.

4. The system of claim 1, further comprising a pyrometer positioned at the proximal end of the quench chamber.

5. The system of claim 1, further comprising a pyrometer positioned at the distal end of the quench chamber.

6. The system of claim 1, wherein the quench chamber further comprises rollers configured to receive and guide the extrudate through the quench chamber.

7. The system of claim 1, wherein the quench chamber comprises four quench zones positioned sequentially from the proximal end to the distal end of the quench chamber, wherein each quench zone comprises at least one PWM atomizing spray nozzle.

8. The system of claim 1, wherein the control module is in communication with the first and second profile scanners.

9. The system of claim 1, wherein the at least one PWM atomizing spray nozzle is configured to spray the extrudate from the billet die.

10. The system of claim 1, further comprising a quench delay dimension.

11. The system of claim 1, wherein the extrudate comprises a regular cross-sectional geometry.

12. The system of claim 1, wherein the extrudate comprises an irregular cross-sectional geometry.

13. The system of claim 1, wherein the extrudate comprises a void.

14. The system of claim 1, wherein the at least one PWM atomizing spray nozzle located at the proximal end of the quench chamber is configured to continuously spray throughout the duty cycle.

15. The system of claim 1, wherein the first profile scanner is positioned to measure a first profile of the extrudate before entering the quench chamber and a second profile scanner is positioned to measure a profile of the extrudate after exiting the quench chamber.

16. The system of claim 15, wherein the control module is configured to compare the first profile with the second profile to determine an extrude distortion and adjust at least one of the liquid pressure, the gas pressure, the spray frequency, the duty cycle and the flow rate associated with the at least one PWM atomizing spray nozzle.

17. The system of claim 1, wherein the extrudate is an aluminum metal or metal alloy.

18. The system of claim 1, wherein the extrudate is an aluminum-silicon-magnesium alloy.

19. The system of claim 1, further comprising a liquid chamber comprising a liquid, wherein the liquid chamber is in fluid communication with the PWM atomizing spray nozzle.

20. The system of claim 19, wherein the liquid comprises water.

21. The system of claim 19, wherein the liquid comprises at least one of oil and a polymer.

\* \* \* \* \*